United States Patent
Valerio et al.

(10) Patent No.: US 10,482,426 B2
(45) Date of Patent: Nov. 19, 2019

(54) PROJECT MANAGEMENT PLATFORM

(71) Applicant: Accenture Global Solutions Limited, Dublin (IE)

(72) Inventors: Joseph Valerio, Ann Arbor, MI (US); Matthew Mahyar Hoss, Brooklyn, NY (US); Muthukrishnan Jaisankar, Hockessin (DE)

(73) Assignee: Accenture Global Solutions Limited, Dublin (IE)

( * ) Notice: Subject to any disclaimer, the term of this patent is extended or adjusted under 35 U.S.C. 154(b) by 189 days.

(21) Appl. No.: 15/431,074

(22) Filed: Feb. 13, 2017

(65) Prior Publication Data
US 2018/0232696 A1  Aug. 16, 2018

(51) Int. Cl.
*H04L 29/08* (2006.01)
*H04L 29/06* (2006.01)
(Continued)

(52) U.S. Cl.
CPC ......... *G06Q 10/103* (2013.01); *G06F 17/211* (2013.01); *G06F 17/2247* (2013.01);
(Continued)

(58) Field of Classification Search
CPC .... G06F 17/24; G06F 17/2247; G06F 17/211; H04L 67/02; H04L 63/08; G06Q 10/103
See application file for complete search history.

(56) References Cited

U.S. PATENT DOCUMENTS

| | | | |
|---|---|---|---|
| 2012/0215900 A1* | 8/2012 | Moyers | H04L 65/1069 709/223 |
| 2013/0297544 A1* | 11/2013 | Allgaier | G06N 20/00 706/46 |

(Continued)

OTHER PUBLICATIONS

'code.tutsplus.com' [online], "An Introduction to Cookies," by Tom Clement, [Retrieved on Apr. 8, 2018], Retrieved from the Internet: URL<https://code.tutsplus.com/tutorials/an-introduction-to-cookies--net-12482>, Jun. 22, 2010, 11 pages.
'www.fastcompany.com' [online], "Customized or Creepy? Websites and Your Data, A Guide," by Steven Melendez, [Retrieved on Apr. 8, 2018], Retrieved from the Internet: URL<https://www.fastcompany.com/3061205/customized-or-creepy-how-websites-toe-the-line-with-user-data >, Jun. 7, 2016, 8 pages.
(Continued)

*Primary Examiner* — Maung T Lwin
*Assistant Examiner* — Suman Debnath
(74) *Attorney, Agent, or Firm* — Fish & Richardson P.C.

(57) ABSTRACT

Implementations are directed to providing a project management (PM) platform as a cloud-based service by providing a content management (CM) platform, and applications on a cloud-based server system, transmitting instructions to display an electronic document on a display of a computing device, and receiving a user selection of an application through the electronic document, and in response: transmitting a first request to the CM platform, receiving a page frame associated with the application from the CM platform, transmitting a second request to server systems, the server systems hosting customizations and data, receiving at least one response from the one or more server systems, the at least one response comprising at least one customization and data, and displaying, on the computing device, an applica-
(Continued)

tion page within the page frame, the application page including the at least one customization, and at least a portion of the data.

30 Claims, 4 Drawing Sheets

(51) Int. Cl.
*G06F 17/21* (2006.01)
*G06F 17/22* (2006.01)
*G06F 17/24* (2006.01)
*G06Q 10/10* (2012.01)

(52) U.S. Cl.
CPC .............. *G06F 17/24* (2013.01); *H04L 63/08* (2013.01); *H04L 67/02* (2013.01); *H04L 67/12* (2013.01); *H04L 67/34* (2013.01); *H04L 67/42* (2013.01)

(56) References Cited

U.S. PATENT DOCUMENTS

| | | | |
|---|---|---|---|
| 2015/0007058 A1* | 1/2015 | Wooten | G06F 3/04842 715/753 |
| 2017/0180372 A1* | 6/2017 | Bezold | G06F 21/6209 |
| 2017/0316367 A1* | 11/2017 | Candito | G06Q 10/063114 |

OTHER PUBLICATIONS

'www.degdigital.com' [online], "Adding Custom Branding to SharePoint Online and Office 365," by Nick Aranzamendi, [Retrieved on Apr. 8, 2018], Retrieved from the Internet: URL<https://www.degdigital.com/insights/dos-and-donts-for-creating-custom-sharepoint-online-designs/ , Oct. 15, 2015, 5 pages.

Extended European Search Report for Application No. 18151461.3, dated Apr. 19, 2018, 8 pages.

* cited by examiner

PROJECT MANAGEMENT PLATFORM

BACKGROUND

Computer-implemented tools can be provided by one or more computer-executable programs that enables users to perform particular functionality. For example, project management tasks can be enabled and supported using a suite of computer-implemented applications combined into a project management platform. In some examples, the project management platform is established for an entity (e.g., an enterprise having employees that use the project management platform). Establishing the project management platform for the entity can entail customizing aspects of the platform including selecting particular applications in the suite of applications, and/or customizing parameters of individual applications (e.g., status labels, notification text).

Traditional implementations of project management platforms, however, have inherent disadvantages. As one example, a traditional project management platform can be difficult to scale for other entities. For example, such project management platforms are at least partially provided as on-premise platforms, meaning that the entity hosts and maintains applications and/or database systems in internal server systems. Consequently, for each entity using the project management platform, new instances of the project platform need be installed and configured on their respective on-premise systems. Besides being time consuming, and burdensome on technical resources, this makes the project management platform difficult to rapidly deploy and mobilize on-demand.

Further, applications implemented in traditional project management systems may be updated from time-to-time (e.g., security patches applied, upgrading versions). If an application includes customizations for a particular entity, the customizations can burden the upgrade process, which results in increased downtime, and burden on technical resources (e.g., processors, memory).

SUMMARY

Implementations of the present disclosure are generally directed to a computer-implemented platform for project management as a service. More particularly, implementations of the present disclosure are directed to a computer-implemented platform for project management as a service (project management platform), the project management (PM) platform including a plurality of computer-implemented project management tools deployed on a cloud-computing platform.

In some implementations, actions include providing a content management (CM) platform, and one or more applications on a cloud-based server system, transmitting computer-executable instructions to display an electronic document on a display of a client-side computing device, and receiving a user selection of an application through the electronic document displayed on the client-side computing device, and in response: transmitting a first request to the CM platform, receiving a page frame associated with the application from the CM platform, transmitting a second request to one or more server systems, the one or more server systems hosting one or more customizations and data, receiving at least one response from the one or more server systems, the at least one response comprising at least one customization and data, and displaying, on the client-side computing device, an application page within the page frame, the application page including the at least one customization, and at least a portion of the data. Other implementations of this aspect include corresponding systems, apparatus, and computer programs, configured to perform the actions of the methods, encoded on computer storage devices.

These and other implementations can each optionally include one or more of the following features: the electronic document includes a web page of a website; the CM platform functions as a container, through which the one or more applications are accessed including the one or more customizations and data; each application of the one or more applications includes computer-executable functionality for one or more project management tasks; actions further include: receiving a user edit to the at least a portion of the data, the user edit being received through the application page, and transmitting the user edit to the one or more server systems; the at least one customization includes one or more of an attribute value, a workflow label, a status label, and notification text, the at least one customization being specific to one or more of an entity accessing the PM platform, and a project being managed using the PM platform; the CM platform includes Sharepoint provided by Microsoft Corporation; actions further include authenticating a user to the PM platform based on user credentials assigned to the user by an enterprise that is independent of a third-party provider of the PM platform; authenticating a user is based on a Security Assertion Markup Language (SAML) standard; and the PM platform is at least partially provided as a multi-tier (N-tier) architecture and enables storage of data to cloud-based storage.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to a computer-implemented platform for project management as a service. More particularly, implementations of the present disclosure are directed to a computer-implemented platform for project management as a service (project management (PM) platform), the PM platform including a plurality of computer-implemented project management tools deployed on a cloud-computing platform. In accordance with implementations of the present disclosure, and as described in further detail herein, the PM platform combines multiple technologies to mobilize and deliver computer-executed project management applications as a service.

As described in further detail herein, implementations of the present disclosure include actions of providing a content management (CM) platform, and one or more applications on a cloud-based server system, transmitting computer-executable instructions to display an electronic document on a display of a client-side computing device, and receiving a user selection of an application through the electronic document displayed on the client-side computing device, and in response: transmitting a first request to the CM platform, receiving a page frame associated with the application from the CM platform, transmitting a second request to one or more server systems, the one or more server systems hosting one or more customizations and data, receiving at least one response from the one or more server systems, the at least one response comprising at least one customization and data, and displaying, on the client-side computing device, an application page within the page frame, the application page including the at least one customization, and at least a portion of the data.

Figure 1:
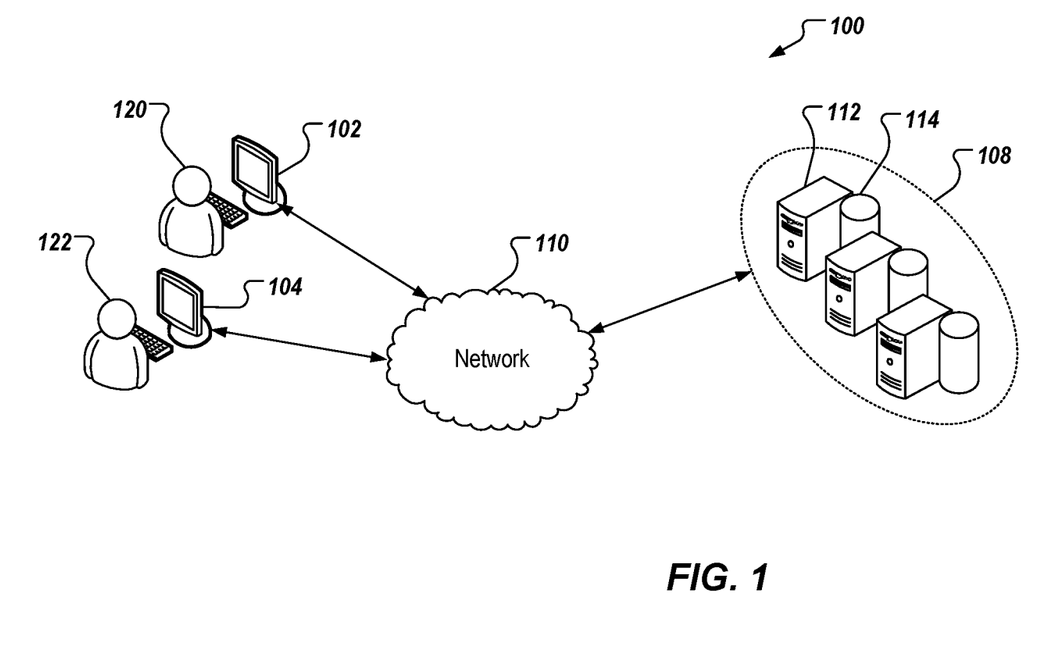
FIG. 1 depicts an example high-level architecture in accordance with implementations of the present disclosure.

FIG. 1 depicts an example high-level architecture 100 in accordance with implementations of the present disclosure. The example architecture 100 includes computing devices 102, 104, a back-end system 108, and a network 110. In some examples, the network 110 includes a local area network (LAN), wide area network (WAN), the Internet, or a combination thereof, and connects web sites, devices (e.g., the computing device 102, 104), and back-end systems (e.g., the back-end system 108). In some examples, the network 110 can be accessed over a wired and/or a wireless communications link. For example, mobile computing devices, such as smartphones can utilize a cellular network to access the network 110.

In the depicted example, the back-end system 108 includes at least one server system 112, and data store 114 (e.g., database and knowledge graph structure). In some examples, at least one server system 112 hosts one or more computer-implemented services that users can interact with using computing devices. For example, the server system 112 can host a PM platform in accordance with implementations of the present disclosure. In some examples, the computing devices 102, 104 can each include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In the depicted example, the computing devices 102, 104 are used by users 120, 122, respectively. In accordance with the present disclosure, the users 120, 122 use the computing devices 102, 104 to interact with the PM platform of the present disclosure. In some examples, the user 120 can include an agent of an enterprise that provides the PM platform. For example, the user 120 can include an administrator that interacts with the PM platform to enable customers of the enterprise to access the PM platform. In some examples, the user 120 can provide customer-specific customizations to the PM platform, as described in further detail herein. In some examples, the user 122 can include a user of a customer of the PM platform. For example, the user 122 can include an employee of a customer, the user 122 accessing the PM platform to perform project management activities on behalf of the customer.

As introduced above, implementations of the present disclosure are directed to a PM platform including a plurality of computer-implemented project management tools deployed on a cloud-computing platform. In accordance with implementations of the present disclosure, and as described in further detail herein, the PM platform provides end-to-end project management services on a cloud-based platform, and includes server hardware, applications (tools), licensing (e.g., hardware, software), and support (e.g., hardware, software). In this manner, customers (also referred to as clients) of the PM platform can forgo their own on-premise, managed and owned project management services.

Figure 2:
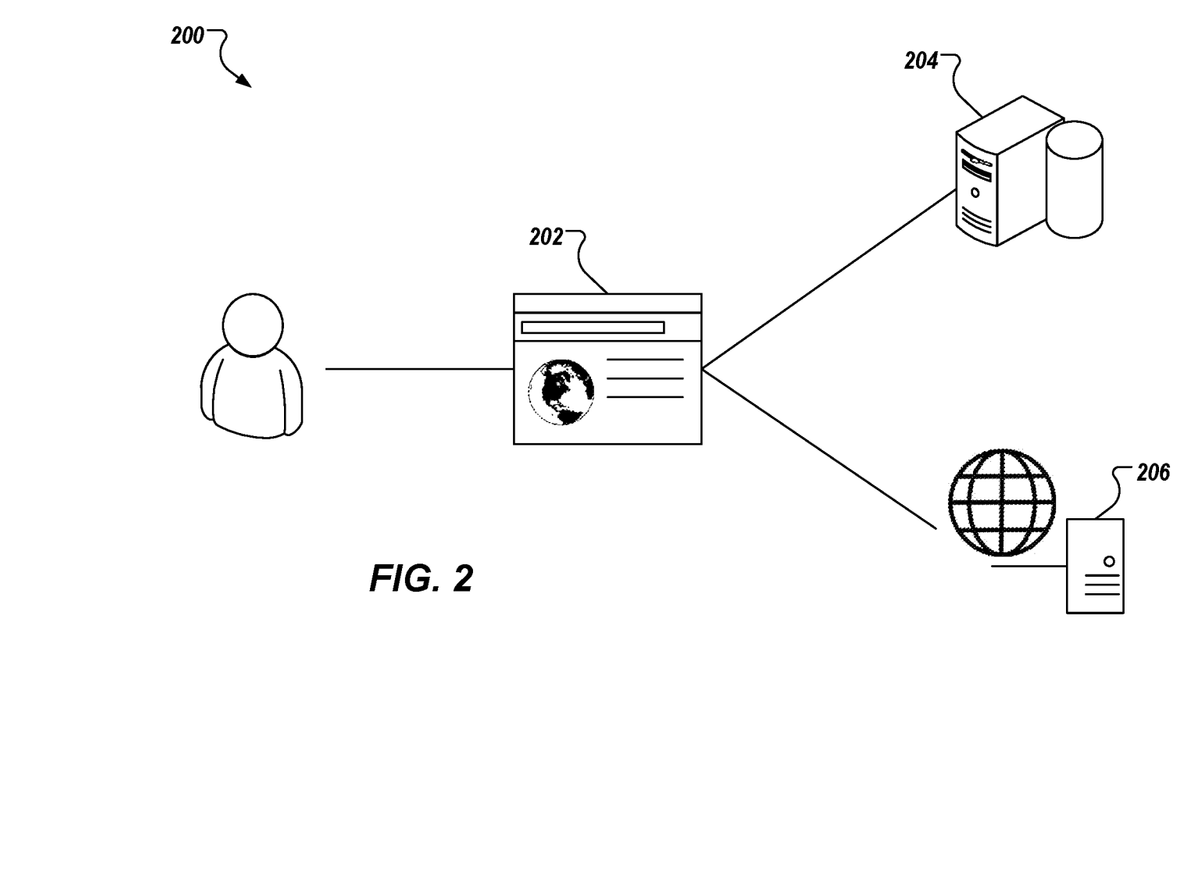
FIG. 2 depicts an example conceptual diagram in accordance with implementations of the present disclosure.

FIG. 2 schematically depicts an example conceptual diagram 200 in accordance with implementations of the present disclosure. The example conceptual diagram 200 includes a website 202, a browser-based collaboration and document management platform (referred to herein as content-management (CM) platform) 204, and one or more PM platform web servers 206. An example CM platform can include SharePoint provided by Microsoft Corp. of Redmond, Wash. In some examples, a user 208 (e.g., one of the users 120, 122 of FIG. 1) interacts with the PM platform of the present disclosure through the website 202. For example, the web site 202 includes a plurality of web pages, which are displayed to the user 208 in a web browser that is executed on a computing device (e.g., the computing device 102, 104 of FIG. 1).

In accordance with implementations of the present disclosure, the website 202, the CM platform 204, and the one or more web servers 206 are operated by an enterprise to provide the PM platform as a service to a plurality of customers (clients). An example enterprise includes Accenture PLC of Dublin, Ireland. In some implementations, the PM platform provides project management tools. In some examples, one or more computer-executable applications are hosted on the one or more web servers 206, each application providing one or more project management tools. Example tools can include enterprise-specific tools, project-specific tool, and client-specific tools. For example, enterprise-specific tools can include tools that are proprietary to the enterprise that is providing the PM platform. In some examples, project-specific tools can include tools that are specific to the particular project being managed using the PM platform, but which might not be used in other projects. In some examples, client-specific tools can include tools that the particular client (e.g., user of the PM platform) uses in their activities. Example functionality provided by one or more of the tools can include standardized forms, workflow management tools, communication tools (e.g., electronic mail), and project management tools (e.g., work plans, issues, risks, actions, change controls, on/off boarding).

In accordance with implementations of the present disclosure, the PM platform provides interfaces, tools, and the like that can be customized for each client. For example, each of the tools (applications) can be customized for particular clients and/or projects. As one example, a first client of the PM platform can have a first project that is managed based on a first customization of tools, and a second client of the PM platform can have a second project that is managed based on a second customization, the second customization being different than the first customization. As another example, a client of the PM platform can have both a first project and a second project that are respectively managed based on a first customization and a second customization, the second customization being different than the first customization.

Example customizations can include, without limitation, which tools are to be implemented for the particular client/project, re-namable attribute values within the tools (e.g., to implemented client-specific, and/or project-specific lexicons/nomenclature), workflow labels (e.g., client-specific, and/or project-specific status labels, notification text, etc.), among several others. In general, implementations of the present disclosure support any appropriate customizations of respective tools. In some implementations, one or more customizations are stored on and accessed from the one or more web servers 206. In some examples, a customization can be provided as computer-executable code that is stored on a web server 206, as described in further detail herein.

In some implementations, the CM platform 204 operates as a container, through which one or more applications of the PM platform can be accessed. In this manner, the tools being used by the client in performing project management activities are presented as though being hosted directly in the CM platform 204, while actually being hosted on the one or more web servers 206. In some implementations, and as described in further detail herein, the user 208 accesses the PM platform through a client web application (e.g., as presented in the website 202), and can browse selected web pages of the CM platform (e.g., a SharePoint page). In some examples, the web page loads resources from the one or more web servers 206. The CM platform (e.g., SharePoint), however, does not directly host any of the applications or data. Instead, the CM platform (through the web page) presents applications of the PM platform, as if they were part of the CM platform.

Accordingly, the CM platform 204 can be described as a gateway for accessing applications of the PM platform of the present disclosure. For example, the user 208 can select a particular application using the website 202. In response, one or more frames of the selected application are loaded from the CM platform 204 (e.g., loaded to the web browser that is displaying the website 204). In some examples, once the one or more frames are loaded from the CM platform 204, the web browser directly communicates with the one or more web servers 206 to retrieve a customization associated with the application. The web server 206 returns the code that embodies the customization, and data (e.g., enterprise-specific data stored in one or more databases (DBs)) that is to be displayed in the application. The web browser executes the code to present the customized application in the web browser, and populates the application with the data. Accordingly, implementations of the present disclosure provide that the frames of applications are provided from the CM platform 204, while application code and data are provided from the one or more web servers 206.

In some implementations, the user 208 can interact with the application through the web browser. For example, the user 208 can edit a row of a table (e.g., add a row, change the name of an existing row, add/edit data values in one or more cells of the row, change a data type of the row) that is displayed by the application. In some examples, an edit submitted by the user 208 is transmitted to the web server 206, which updates the back-end systems accordingly (e.g., updates one or more database rows in response to the edits), and returns updated information back to the web browser.

One or more improvements implementations of the present disclosure achieve over traditional approaches can be described with reference to the example conceptual diagram 200 of FIG. 2. For example, in a traditional approach, all tools (e.g., applications) accessed through a CM platform are customized through the CM platform itself. Depending on the provider of the CM platform, the customization options may be limited. For example, complex use cases, customizations above and beyond what the provider of the CM platform allows may be required. Further, the CM platform may be blackbox. Consequently, if an issue arises with a customization, it can be difficult for a user to troubleshoot issues. Further, customizations applied directly through the CM platform can increase the time and computing resources (e.g., memory, processors) required for performing upgrades to an application (e.g., installing a security patch to an application, upgrading an application to a newer version).

In contrast, and as described herein, the CM platform 204 provides application frames for an application to be accessed through the web browser, and customizations are accessed from the web server 206 through the web browser. In this manner, management and control of the customizations is external to the CM platform 208.

With continued reference to FIG. 2, an example tool and user interaction are discussed below to highlight implementations of the present disclosure. For example, the user 208 can access a project management application and select a datasheet view to view action items and respective attributes of the action items (e.g., in tabular form). For example, each action item can correspond to an activity that is to be performed as part of a project being managed using the PM platform of the present disclosure. In accordance with implementations of the present disclosure, the CM platform 204 provides the application frame for displaying the datasheet view, while the web server 206 provides any customizations that are to be applied, and data that is to be used to populate the datasheet view.

An example customization can include accessing a repository associated with a particular type of action (e.g., mitigating actions), and providing a respective datasheet view for action items of the particular type. In some examples, the datasheet view can be interacted with based on standard (non-customized) functionality provided by the CM platform 204. For example, sorting or filtering of rows can be standard functionality provided by the CM platform 204. In some examples, the datasheet view can be interacted with based on customized functionality. For example, the application can be customized to enable editing of data values in cells of the datasheet view, an example functionality that is not provided by the CM platform 204. Accordingly, because the customized functionality is not provided by the CM platform 204 itself, the customized functionality can be considered an extension of the CM platform 204.

Figure 3:
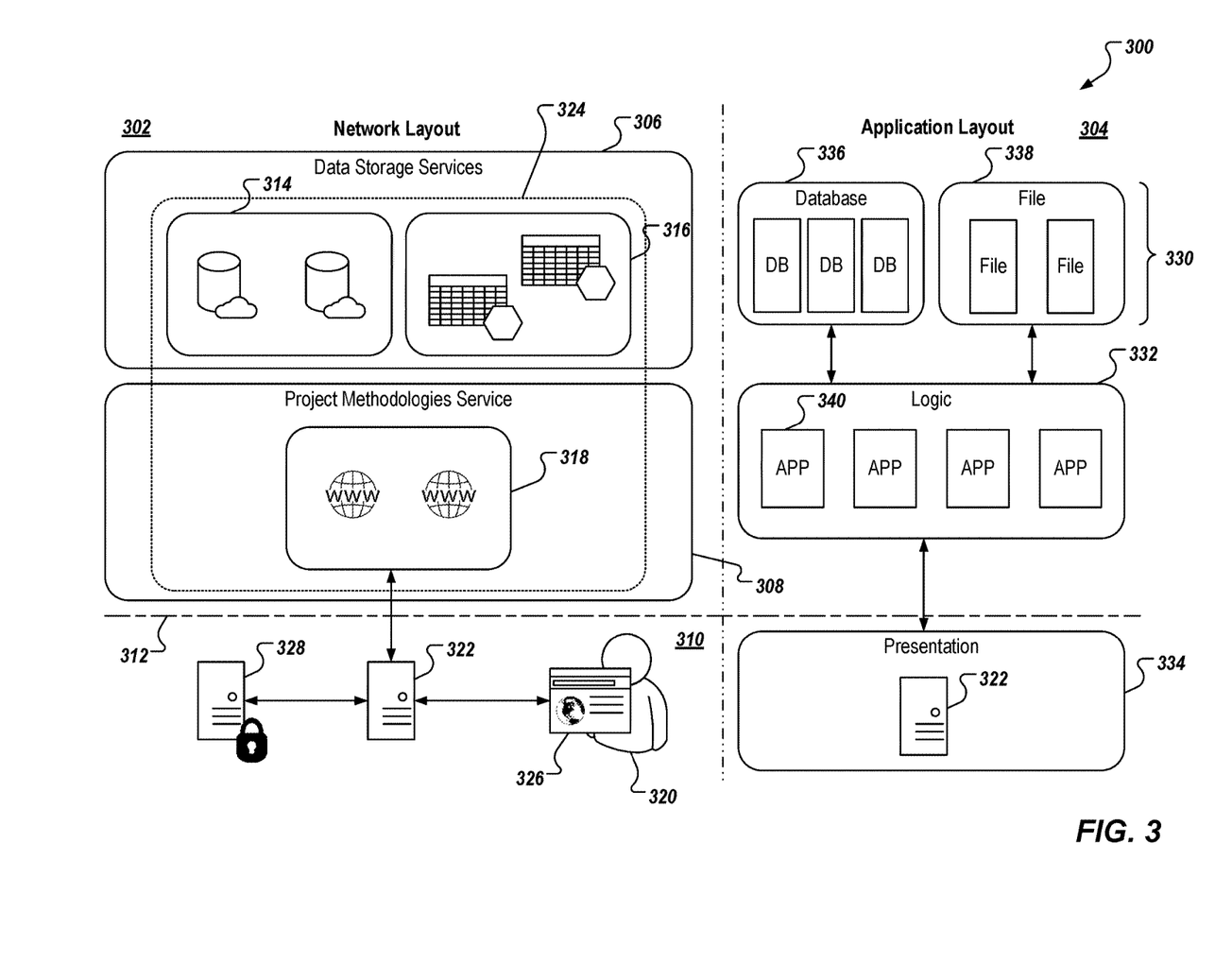
FIG. 3 depicts an example high-level architecture in accordance with implementations of the present disclosure.

FIG. 3 depicts an example architecture 300 in accordance with implementations of the present disclosure. The example architecture 300 can be described as a multi-tier, or N-tier architecture, and includes a network layout 302, and an application layout 304. In the depicted example, the network layout 302 includes data storage services 306, and a project methodologies service 308 that can be accessed by a client network 310 (e.g., through a firewall 312). In the depicted example, the data storage services 306 include database services 314, and file storage services 316. Example database services 314 can include a cloud-based database service, such as Azure Cloud SQL Database provided by Microsoft, and example file storage services 316 can include a cloud-based file storage service, such as Azure Storage provided by Microsoft. In some examples, the project methodologies service 308 includes one or more websites 318, through which users can interact with project management tools (applications) of the PM platform. In some implementations, a virtual network 324 can be provided, through which the data storage services 306, and the project methodologies services 308 are accessed.

In some examples, the client network 310 can be a network operated by and/or on behalf of a client. For example, a user 320 (e.g., the user 208 of FIG. 2) can access applications of the PM platform through a CM platform 322 (e.g., the CM platform 204 of FIG. 2), which interacts with the data storage services 306, and the project methodologies services 308 (e.g., through the virtual network 324). In some examples, the user 320 interacts with the CM platform 322 through web pages of a website 326 (e.g., the website 202 of FIG. 2). In the depicted example, an authentication platform 328 is provided, which can be used to authenticate users accessing the CM platform 322. In some examples, the authentication platform 328 receives uses credentials (e.g., username/password, PIN, biometric data) to authenticate a user against groundtruth data (e.g., stored username/password, stored PIN, stored biometric signature). An example authentication technology can include Security Assertion Markup Language (SAML), which is an XML-based, open-standard data format provided by the OASIS Security Services Technical Committee, and enables exchanging authentication and authorization data between an identity provider and a service provider. In some examples, if the user is determined to be authenticated, the user is granted access to the CM platform 322. Otherwise, the user is denied access to the CM platform 322. In some examples, the authentication platform 328 can be used to determine one or more roles of an authenticated user, which roles can influence the type of functionality and/or data that the user can access through the CM platform 322. An example role can include administrator, and users being assigned this role may be able to perform functionality that users of other roles are unable to perform (e.g., add new users, provide credentials to users, remove users).

In the depicted example, the application layout 304 includes a data layer 330, a logic layer 322, and a presentation layer 334. In some examples, the data layer 330 includes a database service 336, and a file storage service 338. In some examples, the logic layer 332 includes application logic for respective platform management applications 340. In some examples, the user 320 accesses one or more applications 340, and data services/data of the data layer 322 through the website 326, as described herein. For example, the user 320 browses the website 326, and selects an application 340 to interact with, and, in response, one or more frames of the selected application are loaded from the CM platform (e.g., loaded to the web browser that is displaying the website 326), and any customizations are applied to and data populated in the application (e.g., as described above with reference to FIG. 2).

Implementations of the present disclosure further provide for on-boarding of new clients to the PM platform. For example, a client can include an enterprise having one or more users that are to be able to access the PM platform to perform project management activities on behalf of the enterprise. In some implementations, a client and/or project instance is created within the PM platform. In some examples, an instance can include a virtual machine (VM) that executes in the PM platform to enable users of the client to access applications and data through the PM platform, as described herein. In some implementations, each user is granted access to the instance, which access can be based on credentials, for example. In some examples, the credentials assigned to users are the same credentials the user has already established with the client. For example, a user (e.g., employee of an enterprise) can have pre-existing credentials (e.g., username, password) that the user uses to access computer-implemented resources of the enterprise. The same credentials can be carried over to the PM platform to enable the user to access a respective instance executing within the PM platform. In this manner, redundancy in assigning and/or managing credentials is avoided.

In some implementations, configuration of the instance is performed. In some examples, configuration can include defining which applications users are to be granted access to, as well as customizing one or more applications for the particular client and/or project (e.g., application fields, status schema/sequence, notification text, etc.). In some examples, a user of the client can include an administrator, who is responsible for day-to-day management of the client's use of the PM platform. In some implementations, a set-up process is performed, which can include importing existing client data into the PM platform (e.g., the one or more web servers 206 of FIG. 2, the data layer 330 of FIG. 3).

Figure 4:
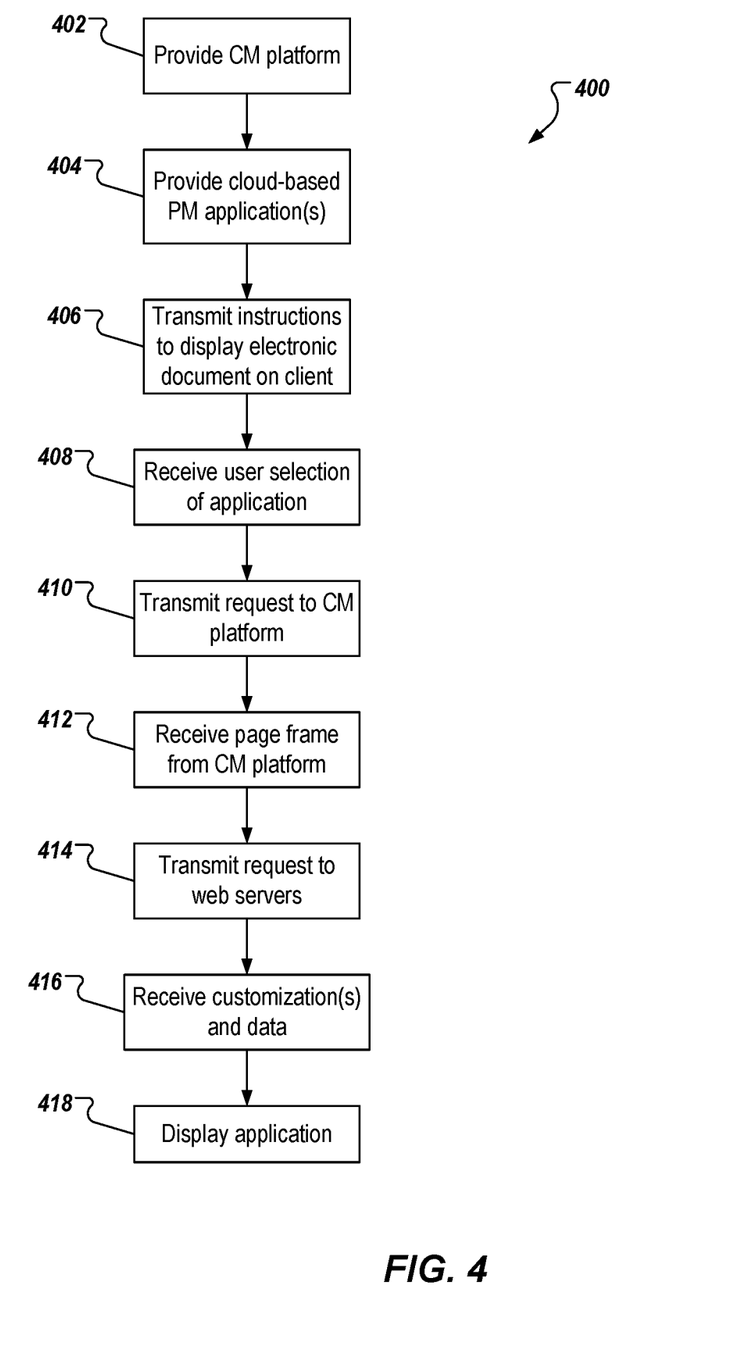
FIG. 4 depicts an example process that can be executed in accordance with implementations of the present disclosure.

FIG. 4 depicts an example process 400 that can be executed in implementations of the present disclosure. In some examples, the example process 400 is provided using one or more computer-executable programs executed by one or more computing devices (e.g., the back-end system 108 of FIG. 1). In some examples, the example process 400 can be executed to provide a PM platform as a cloud-based service, as described herein.

A CM platform is provided (402). For example, the CM platform is hosted on one or more server systems. In some examples, the one or more server systems are operated by or on behalf of an enterprise providing the PM platform. One or more applications are provided on a cloud-based server system (404). In some examples, each application of the one or more applications includes computer-executable functionality for one or more project management tasks.

Computer-executable instructions to display an electronic document on a display of a client-side computing device are transmitted (406). For example, the instructions can be transmitted to a client-side computing device (e.g., the computing device 102 of FIG. 1), and can be processed by a web browser to display the electronic document as a web page (e.g., the web page 202 of FIG. 2). In some examples, the instructions include hypertext mark-up language, cascading style sheets (CSS), and/or any appropriate computer-executable code to provide the web page.

A user selection of an application is received (408). For example, a user of the client-side computing device can select an application through the electronic document (web page) displayed on the client-side computing device. In response to the user selection, a first request is transmitted to the CM platform (410), a page frame associated with the application is received from the CM platform (412), a second request is transmitted to one or more server systems (414), at least one response is received from the one or more server systems (416), then at least one response comprising at least one customization and data, and an application page is displayed within the page frame, the application page including the at least one customization, and at least a portion of data (418).

Accordingly, and as described in detail herein, the CM platform operates as a container, through which one or more applications of the PM platform can be accessed, such that the tools (applications) are presented as though being hosted directly in the CM platform, while actually being hosted on the one or more server systems (e.g., the web servers 206 of FIG. 2). As also described in detail herein, the user accesses the PM platform through a client web application, and can select a particular application. In response, one or more frames of the selected application are loaded from the CM platform, and the web browser directly communicates with the one or more server system to retrieve a customization associated with the application, and data to be displayed in the application. The web browser executes code to present the customized application in the web browser, and populates the application with the data. Accordingly, implementations of the present disclosure provide that the frames of applications are provided from the CM platform, while application code and data are provided from the one or more web servers.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for providing a project management (PM) platform as a cloud-based service, the method being executed by one or more processors and comprising:
    providing, by the one or more processors, a content management (CM) platform, and one or more applications on a cloud-based server system, the CM platform operating as a container, through which one or more applications of the PM platform can be accessed, such that the one or more applications are presented as though being hosted directly in the CM platform, while being hosted on one or more server systems, the one or more server systems being distinct from the CM platform;
    transmitting, by the one or more processors, computer-executable instructions to display an electronic document within a web browser on a display of a client-side computing device; and
    receiving, by the one or more processors, a user selection of an application through the electronic document displayed within the web browser on the client-side computing device, and in response:
        transmitting, through the web browser, a first request to the CM platform,
        loading, from the CM platform, a page frame of the application, the page frame being loaded to the web browser to enable the web browser to directly communicate with the one or more server systems through the page frame to retrieve one or more customizations associated with the application,
        transmitting, through the web browser, a second request to the one or more server systems hosting the application, the one or more server systems storing one or more customizations and data,
        receiving at least one response from the one or more server systems, the at least one response comprising at least one customization and data, the customization customizing the application to a particular client of a plurality of clients, and
        displaying, on the client-side computing device, an application page within the page frame, the application page comprising the at least one customization, and at least a portion of the data.

2. The method of claim 1, wherein the electronic document comprises a web page of a web site.

3. The method of claim 1, wherein the CM platform functions as a container, through which the one or more applications are accessed including the one or more customizations and data.

4. The method of claim 1, wherein each application of the one or more applications comprises computer-executable functionality for one or more project management tasks.

5. The method of claim 1, further comprising:
    receiving, by the one or more processors, a user edit to the at least a portion of the data, the user edit being received through the application page; and
    transmitting, by the one or more processors, the user edit to the one or more server systems.

6. The method of claim 1, wherein the at least one customization comprises one or more of an attribute value, a workflow label, a status label, and notification text, the at least one customization being specific to one or more of an entity accessing the PM platform, and a project being managed using the PM platform.

7. The method of claim 1, wherein the CM platform comprises Sharepoint provided by Microsoft Corporation.

8. The method of claim 1, further comprising authenticating a user to the PM platform based on user credentials assigned to the user by an enterprise that is independent of a third-party provider of the PM platform.

9. The method of claim 8, wherein authenticating a user is based on a Security Assertion Markup Language (SAML) standard.

10. The method of claim 1, wherein the PM platform is at least partially provided as a multi-tier (N-tier) architecture and enables storage of data to cloud-based storage.

11. One or more non-transitory computer-readable storage media coupled to one or more processors and having instructions stored thereon which, when executed by the one or more processors, cause the one or more processors to perform operations for providing a project management (PM) platform as a cloud-based service, the operations comprising:
    providing a content management (CM) platform, and one or more applications on a cloud-based server system, the CM platform operating as a container, through which one or more applications of the PM platform can be accessed, such that the one or more applications are presented as though being hosted directly in the CM platform, while being hosted on one or more server systems, the one or more server systems being distinct from the CM platform;
    transmitting computer-executable instructions to display an electronic document within a web browser on a display of a client-side computing device; and receiving a user selection of an application through the electronic document displayed within the web browser on the client-side computing device, and in response:

transmitting, through the web browser, a first request to the CM platform, loading, from the CM platform, a page frame of the application, the page frame being loaded to the web browser to enable the web browser to directly communicate with the one or more server systems through the page frame to retrieve one or more customizations associated with the application, transmitting, through the web browser, a second request to the one or more server systems hosting the application, the one or more server systems storing one or more customizations and data, receiving at least one response from the one or more server systems, the at least one response comprising at least one customization and data, the customization customizing the application to a particular client of a plurality of clients, and displaying, on the client-side computing device, an application page within the page frame, the application page comprising the at least one customization, and at least a portion of the data.

12. The computer-readable storage media of claim 11, wherein the electronic document comprises a web page of a web site.

13. The computer-readable storage media of claim 11, wherein the CM platform functions as a container, through which the one or more applications are accessed including the one or more customizations and data.

14. The computer-readable storage media of claim 11, wherein each application of the one or more applications comprises computer-executable functionality for one or more project management tasks.

15. The computer-readable storage media of claim 11, wherein operations further comprise:

receiving a user edit to the at least a portion of the data, the user edit being received through the application page; and transmitting the user edit to the one or more server systems.

16. The computer-readable storage media of claim 11, wherein the at least one customization comprises one or more of an attribute value, a workflow label, a status label, and notification text, the at least one customization being specific to one or more of an entity accessing the PM platform, and a project being managed using the PM platform.

17. The computer-readable storage media of claim 11, wherein the CM platform comprises Sharepoint provided by Microsoft Corporation.

18. The computer-readable storage media of claim 11, wherein operations further comprise authenticating a user to the PM platform based on user credentials assigned to the user by an enterprise that is independent of a third-party provider of the PM platform.

19. The computer-readable storage media of claim 18, wherein authenticating a user is based on a Security Assertion Markup Language (SAML) standard.

20. The computer-readable storage media of claim 11, wherein the PM platform is at least partially provided as a multi-tier (N-tier) architecture and enables storage of data to cloud-based storage.

21. A system, comprising:
one or more processors; and
a computer-readable storage device coupled to the one or more processors and having instructions stored thereon which, when executed by the one or more processors, cause the one or more processors to perform operations for providing a project management (PM) platform as a cloud-based service, the operations comprising:

providing a content management (CM) platform, and one or more applications on a cloud-based server system, the CM platform operating as a container, through which one or more applications of the PM platform can be accessed, such that the one or more applications are presented as though being hosted directly in the CM platform, while being hosted on one or more server systems, the one or more server systems being distinct from the CM platform;

transmitting computer-executable instructions to display an electronic document within a web browser on a display of a client-side computing device; and receiving a user selection of an application through the electronic document displayed within the web browser on the client-side computing device, and in response:

transmitting, through the web browser, a first request to the CM platform, loading, from the CM platform, a page frame of the application, the page frame being loaded to the web browser to enable the web browser to directly communicate with the one or more server systems through the page frame to retrieve one or more customizations associated with the application, transmitting, through the web browser, a second request to the one or more server systems hosting the application, the one or more server systems storing one or more customizations and data, receiving at least one response from the one or more server systems, the at least one response comprising at least one customization and data, the customization customizing the application to a particular client of a plurality of clients, and displaying, on the client-side computing device, an application page within the page frame, the application page comprising the at least one customization, and at least a portion of the data.

22. The system of claim 21, wherein the electronic document comprises a web page of a website.

23. The system of claim 21, wherein the CM platform functions as a container, through which the one or more applications are accessed including the one or more customizations and data.

24. The system of claim 21, wherein each application of the one or more applications comprises computer-executable functionality for one or more project management tasks.

25. The system of claim 21, wherein operations further comprise:

receiving a user edit to the at least a portion of the data, the user edit being received through the application page; and transmitting the user edit to the one or more server systems.

26. The system of claim 21, wherein the at least one customization comprises one or more of an attribute value, a workflow label, a status label, and notification text, the at least one customization being specific to one or more of an entity accessing the PM platform, and a project being managed using the PM platform.

27. The system of claim 21, wherein the CM platform comprises Sharepoint provided by Microsoft Corporation.

28. The system of claim 21, wherein operations further comprise authenticating a user to the PM platform based on user credentials assigned to the user by an enterprise that is independent of a third-party provider of the PM platform.

29. The system of claim 28, wherein authenticating a user is based on a Security Assertion Markup Language (SAML) standard.

30. The system of claim 21, wherein the PM platform is at least partially provided as a multi-tier (N-tier) architecture and enables storage of data to cloud-based storage.

\* \* \* \* \*